United States Patent
Tokuda et al.

(10) Patent No.: US 11,609,139 B2
(45) Date of Patent: Mar. 21, 2023

(54) PRESSURE SENSOR

(71) Applicant: Azbil Corporation, Tokyo (JP)

(72) Inventors: Tomohisa Tokuda, Tokyo (JP); Kouji Yuuki, Tokyo (JP); Tatsuo Tanaka, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 144 days.

(21) Appl. No.: 17/156,832

(22) Filed: Jan. 25, 2021

(65) Prior Publication Data

US 2021/0239555 A1 Aug. 5, 2021

(30) Foreign Application Priority Data

Jan. 30, 2020 (JP) .............................. JP2020-013753

(51) Int. Cl.
*G01L 9/00* (2006.01)
(52) U.S. Cl.
CPC .................................. *G01L 9/0054* (2013.01)
(58) Field of Classification Search
CPC ....... G01L 9/0054; G01L 9/16; G01L 9/0052; G01L 9/0041; G01L 9/06
See application file for complete search history.

(56) References Cited

U.S. PATENT DOCUMENTS

| | | | |
|---|---|---|---|
| 2010/0083765 A1* | 4/2010 | Yoneda | G01L 9/065 73/721 |
| 2015/0268116 A1* | 9/2015 | Fuji | G01L 9/0042 438/3 |
| 2015/0271586 A1* | 9/2015 | Fukuzawa | G01L 9/16 73/720 |
| 2015/0338300 A1* | 11/2015 | Masunishi | G01L 9/16 73/725 |
| 2016/0003697 A1* | 1/2016 | Okamoto | G01L 9/16 73/862.632 |
| 2018/0058965 A1* | 3/2018 | Yuzawa | H01L 41/20 |
| 2018/0356308 A1 | 12/2018 | Toshiba | |

FOREIGN PATENT DOCUMENTS

JP 5227729 B2 7/2013
JP 2016-014581 A 1/2016

* cited by examiner

*Primary Examiner* — Francis C Gray

(57) ABSTRACT

The present disclosure enables measurement with satisfactory sensitivity in a low pressure range, and thus accurate measurement in a wider pressure range, by providing a pressure sensor that includes a diaphragm layer and a pressure receiving region formed in the diaphragm layer. In addition, the pressure sensor includes a first piezostrictive element, a second piezostrictive element, a third piezostrictive element, and a fourth piezostrictive element. In addition, the pressure sensor includes a first magnetostrictive element, a second magnetostrictive element, a third magnetostrictive element, and a fourth magnetostrictive element.

20 Claims, 5 Drawing Sheets

PRESSURE SENSOR

CROSS REFERENCE TO RELATED APPLICATIONS

This patent application claims the benefit of foreign priority to Japanese Patent Application No. JP 2020-013753 filed on Jan. 30, 2020, the disclosure of which is hereby incorporated by reference in its entirety.

BACKGROUND OF THE INVENTION

The present disclosure relates to a pressure sensor.

For example, in petroleum, petrochemical, and chemical plants, a piezoresistance-type pressure sensor is used to measure a flow rate, a pressure, a liquid level, specific gravity of a process fluid or the like (refer to PTL 1). The piezoresistance-type pressure sensor is excellent in response linearity, but has low sensitivity in a low pressure region. In this type of the pressure sensor, in order to improve the sensitivity, a countermeasure is to provide a thinner diaphragm. However, when the diaphragm is thinner, problems arise in that a body pressure is lowered and an upper limit value of a measurable pressure is lowered.

On the other hand, a strain detection element having a gauge factor 50 times or greater that of the piezoresistance type has been proposed (refer to PTL 2). The element includes a detection magnetic layer and a reference magnetic layer whose magnetization is changed due to a strain, and has a magnetic tunnel junction structure in which the detection magnetic layer and the reference magnetic layer are subjected to tunnel junction via a barrier layer (magnetic tunnel junction element).

CITATION LIST

Patent Literature

[PTL 1] Japanese Patent No. 5227729
[PTL 2] JP-A-2016-014581

BRIEF SUMMARY OF THE INVENTION

While the pressure sensor using the magnetic tunnel junction element has high sensitivity in a range having a small pressure value, it has degraded response linearity at a pressure outside its own detection range, thereby causing a problem in that the pressure cannot be accurately measured.

The present disclosure is made to solve the above-described problem, and an object thereof is to enable measurement with satisfactory sensitivity in a low pressure range and to enable accurate measurement in a wider pressure range.

According to an aspect of the present disclosure, there is provided a pressure sensor including a diaphragm layer, a pressure receiving region formed in the diaphragm layer, a piezostrictive measurement unit provided in the diaphragm layer in an outer peripheral portion of the pressure receiving region, and formed of a piezostrictive element that measures a strain of the pressure receiving region by using a piezoresistance effect, and a magnetostrictive measurement unit provided in the pressure receiving region of the diaphragm layer, and formed of a magnetostrictive element that is formed of a material whose magnetization is changed due to the strain, and that measures the strain of the pressure receiving region.

In one configuration example of the pressure sensor, the piezostrictive measurement unit and the magnetostrictive measurement unit may be disposed at positions where generated stress peaks in the pressure receiving region.

In one configuration example of the pressure sensor, the piezostrictive measurement unit may be disposed at a location where a piezoelectric effect is generated in the pressure receiving region.

In one configuration example of the pressure sensor, the piezostrictive measurement unit may be formed of a first piezostrictive element, a second piezostrictive element, a third piezostrictive element, and a fourth piezostrictive element which form a first bridge circuit. The magnetostrictive measurement unit may be formed of a first magnetostrictive element, a second magnetostrictive element, a third magnetostrictive element, and a fourth magnetostrictive element which form a second bridge circuit. The magnetostrictive measurement unit may be disposed at a location different from that of the piezostrictive measurement unit.

In one configuration example of the pressure sensor, each of the first piezostrictive element, the second piezostrictive element, the third piezostrictive element, and the fourth piezostrictive element may have a rectangular shape in a plan view. The first piezostrictive element and the third piezostrictive element may be in a state where each axis in a longitudinal direction is parallel to a straight line extending in a radial direction from a center of the pressure receiving region. The second piezostrictive element and the fourth piezostrictive element may be in a state where each axis in a longitudinal direction is perpendicular to a straight line extending in the radial direction from the center of the pressure receiving region.

In one configuration example of the pressure sensor, the first piezostrictive element and the second piezostrictive element may be disposed adjacent to each other. The third piezostrictive element and the fourth piezostrictive element may be disposed adjacent to each other.

In one configuration example of the pressure sensor, the pressure sensor may further include a first auxiliary pressure receiving region, a second auxiliary pressure receiving region, a third auxiliary pressure receiving region, and a fourth auxiliary pressure receiving region which are formed around the pressure receiving region of the diaphragm layer, a first auxiliary piezostrictive element and a second auxiliary piezostrictive element which are provided in the first auxiliary pressure receiving region, a first auxiliary magnetostrictive element and a second auxiliary magnetostrictive element which are provided in the second auxiliary pressure receiving region, a third auxiliary piezostrictive element and a fourth auxiliary piezostrictive element which are provided in the third auxiliary pressure receiving region, and a third auxiliary magnetostrictive element and a fourth auxiliary magnetostrictive element which are provided in the fourth auxiliary pressure receiving region. The first auxiliary pressure receiving region, the second auxiliary pressure receiving region, the third auxiliary pressure receiving region, and the fourth auxiliary pressure receiving region may be respectively disposed at an equal distance from a center of the pressure receiving region.

In one configuration example of the pressure sensor, the pressure receiving region may have a circular shape in a plan view.

In one configuration example of the pressure sensor, the pressure receiving region may have a square shape in a plan view.

As described above, according to the present disclosure, the piezostrictive measurement unit and the magnetostrictive measurement unit are provided in the pressure receiving region of the diaphragm layer. Therefore, the present disclosure enables accurate measurement in a wider pressure range.

DETAILED DESCRIPTION OF THE INVENTION

Hereinafter, a pressure sensor according to embodiments of the present disclosure will be described.

Embodiment 1

Figure 1A:
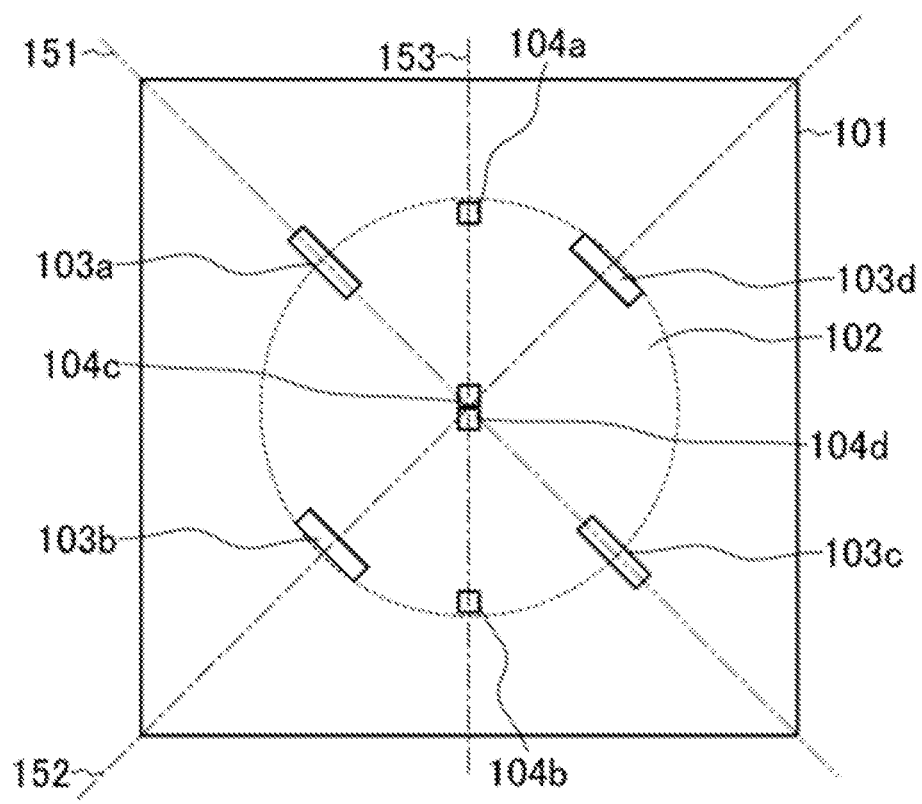
FIG. 1A is a plan view illustrating a configuration of a pressure sensor according to Embodiment 1 of the present disclosure.
Figure 1B:
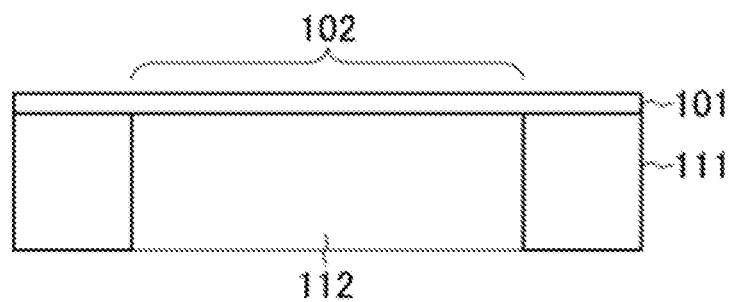
FIG. 1B is a sectional view illustrating a configuration of the pressure sensor according to Embodiment 1 of the present disclosure.

First, a pressure sensor according to Embodiment 1 of the present disclosure will be described with reference to FIGS. 1A and 1B.

The pressure sensor includes a diaphragm layer 101 and a pressure receiving region 102 formed in the diaphragm layer 101. For example, the pressure receiving region 102 has a circular shape in a plan view. The pressure receiving region 102 is a partial region of the diaphragm layer 101, and for example, the pressure receiving region 102 can be deflected (deformed) in a normal direction of a plane of the diaphragm layer 101. The pressure receiving region 102 may have a polygonal shape such as a square shape in a plan view. For example, the diaphragm layer 101 is formed on a base 111. The base 111 has a through-hole 112 that penetrates the base 111 in a thickness direction. For example, the base 111 can be formed of single-crystal silicon. In this case, the pressure receiving region 102 is a partial region of the diaphragm layer 101 which is defined by a space of the through-hole 112.

In addition, the pressure sensor includes a first piezostrictive element 103a, a second piezostrictive element 103b, a third piezostrictive element 103c, and a fourth piezostrictive element 103d in the diaphragm layer 101 on outer peripheral portions of the pressure receiving region 102. The first piezostrictive element 103a, the second piezostrictive element 103b, the third piezostrictive element 103c, and the fourth piezostrictive element 103d serve as a piezostrictive measurement unit that measures a strain of the pressure receiving region 102 by using a piezoresistance effect. The piezostrictive element can be disposed at a position where generated stress peaks in the pressure receiving region 102. In addition, the piezostrictive element is disposed at a location where the piezoelectric effect is generated in the pressure receiving region 102.

For example, the diaphragm layer 101 is formed of single-crystal silicon whose main surface has a plane orientation of (100). In addition, the piezostrictive element can be formed of a piezoresistance region including a p-type region into which boron (B) serving as a p-type impurity is introduced, at a predetermined location of the diaphragm layer 101 formed of the single-crystal silicon.

In this example, four of the first piezostrictive elements 103a, the second piezostrictive element 103b, the third piezostrictive element 103c, and the fourth piezostrictive element 103d are disposed at an equal interval in a circumferential direction of the pressure receiving region 102. In addition, a first straight line 151 connecting the first piezostrictive element 103a and the third piezostrictive element 103c and a second straight line 152 connecting the second piezostrictive element 103b and the fourth piezostrictive element 103d are orthogonal to each other. The first straight line 151 and the second straight line 152 extend in a crystalline orientation of 110 of the single-crystal silicon whose main surface forming the diaphragm layer 101 has a plane orientation of (100).

In a plan view, the first piezostrictive element 103a and the third piezostrictive element 103c are formed in a rectangular shape in which a longitudinal direction extends in the crystalline orientation of 110 of the single-crystal silicon, and measure a strain generated by deflection of the pressure receiving region 102. In this example, in a plan view, the first piezostrictive element 103a and the third piezostrictive element 103c are formed in a rectangular shape in which each axis in the longitudinal direction is parallel to a straight line extending in a radial direction from a center of the pressure receiving region 102.

On the other hand, in a plan view, the second piezostrictive element 103b and the fourth piezostrictive element 103d are formed in a rectangular shape in which a longitudinal direction extends in the crystalline orientation of 110 of the single-crystal silicon, and measure the strain generated by the deflection of the pressure receiving region 102. In this example, in a plan view, the second piezostrictive element 103b and the fourth piezostrictive element 103d are formed in a rectangular shape in which each axis in the longitudinal direction is perpendicular to a straight line extending in the radial direction from the center of the pressure receiving region 102.

According to the above-described configuration, when the pressure receiving region 102 is deflected, the first piezostrictive element 103a and the third piezostrictive element 103c, and the second piezostrictive element 103b and the fourth piezostrictive element 103d, are in a state where the signs of respective resistance values are different from each other.

In addition, the pressure sensor includes a first magnetostrictive element 104a, a second magnetostrictive element 104b, a third magnetostrictive element 104c, and a fourth magnetostrictive element 104d in the pressure receiving region 102 of the diaphragm layer 101. The first magnetostrictive element 104a, the second magnetostrictive element 104b, the third magnetostrictive element 104c, and the fourth magnetostrictive element 104d are formed of a material whose magnetization is changed due to the strain, and serve as a magnetostrictive measurement unit that measures the strain of the pressure receiving region 102. The magnetostrictive element can be disposed at a position where the generated stress peaks in the pressure receiving region 102.

Each of the first magnetostrictive element 104a, the second magnetostrictive element 104b, the third magnetostrictive element 104c, and the fourth magnetostrictive element 104d includes a detection magnetic layer whose magnetization is changed due to the strain and a reference magnetic layer serving as a reference for the detection magnetic layer. The detection magnetic layer and the reference magnetic layer are subjected to tunnel junction via a barrier layer, and measure the strain of the pressure receiving region 102 by using a resistance change between the detection magnetic layer and the reference magnetic layer. For example, the reference magnetic layer is a layer having fixed magnetization, and the magnetization is not changed due to the strain.

The detection magnetic layer, the barrier layer, and the reference magnetic layer of each magnetostrictive element are disposed on the diaphragm layer 101 in a state of being stacked one on another in a thickness direction of the diaphragm layer 101, for example. In this case, the first magnetostrictive element 104a and the second magnetostrictive element 104b are disposed at locations where a tensile strain is generated due to the deflection of the pressure receiving region 102. For example, the first magnetostrictive element 104a and the second magnetostrictive element 104b are disposed in the diaphragm layer 101 on outer peripheral portions of the pressure receiving region 102. High sensitivity can be obtained by disposing the elements at the location where the tensile strain is most generated (position where the tensile strain peaks).

On the other hand, the third magnetostrictive element 104c and the fourth magnetostrictive element 104d are disposed at locations where a compression strain is generated due to the deflection of the pressure receiving region 102. For example, the third magnetostrictive element 104c and the fourth magnetostrictive element 104d are disposed in a central portion of the pressure receiving region 102. The third magnetostrictive element 104c and the fourth magnetostrictive element 104d can also be disposed at locations (other than the pressure receiving region 102) where the strain is not generated.

In addition, the first magnetostrictive element 104a, the second magnetostrictive element 104b, the third magnetostrictive element 104c, and the fourth magnetostrictive element 104d are disposed at locations different from those of the first piezostrictive element 103a, the second piezostrictive element 103b, the third piezostrictive element 103c, and the fourth piezostrictive element 103d. For example, an angle formed between a third straight line 153 connecting the first magnetostrictive element 104a and the third magnetostrictive element 104c and the first straight line 151 can be set to 45°. The first straight line 151, the second straight line 152, and the third straight line 153 do not actually exist, but are virtual lines for specifying positions.

In the above-described pressure sensor, first, the first piezostrictive element 103a, the second piezostrictive element 103b, the third piezostrictive element 103c, and the fourth piezostrictive element 103d form a first bridge circuit using the elements as resistance elements. When stress is generated in the pressure receiving region 102 in a state where a constant current flows, the first bridge circuit outputs a change in the resistance value of each piezostrictive element (piezoresistance region) which is caused by the generated stress, as a voltage change. Each node of the first bridge circuit is connected to an electrode (not illustrated) via a wiring pattern formed on a surface of a region (not illustrated) of the diaphragm layer 101.

In addition, in the pressure sensor, the first magnetostrictive element 104a, the second magnetostrictive element 104b, the third magnetostrictive element 104c, and the fourth magnetostrictive element 104d form a second bridge circuit using the elements as resistance elements. When the stress is generated in the pressure receiving region 102 in a state where an external magnetic field is applied to the first magnetostrictive element 104a, the second magnetostrictive element 104b, the third magnetostrictive element 104c, and the fourth magnetostrictive element 104d, the second bridge circuit outputs a change in the resistance value of each magnetic tunnel junction element which is caused by the generated stress, as a voltage change.

For example, a first measurement unit obtains a first measurement candidate by measurement using the first piezostrictive element 103a, the second piezostrictive element 103b, the third piezostrictive element 103c, and the fourth piezostrictive element 103d. In addition, a second measurement unit obtains a second measurement candidate by measurement using the first magnetostrictive element 104a, the second magnetostrictive element 104b, the third magnetostrictive element 104c, and the fourth magnetostrictive element 104d.

After each candidate is obtained as described above, when the first measurement candidate falls within a range of a set minute pressure value, a determination unit determines the second measurement candidate as a measurement result. On the other hand, when the first measurement candidate exceeds the range of the set minute pressure value and has a greater pressure value, the determination unit determines the first measurement candidate as the measurement result. The range of the minute pressure value is set to a range in which the magnetostrictive element has response linearity.

In the magnetostrictive element, a detection magnetic layer whose magnetization is changed due to the strain, a non-magnetic layer formed of a non-magnetic material, and a reference magnetic layer serving as a reference for the detection magnetic layer are stacked in this order. The magnetostrictive element can measure the strain of the pressure receiving region by using a resistance change in a direction parallel to a plane of the non-magnetic layer. In this case, as in the configuration of the piezostrictive element, four of the first magnetostrictive element, the second magnetostrictive element, the third magnetostrictive element, and the fourth magnetostrictive element can be used. In addition, in this case, the shape of the first magnetostrictive element and the third magnetostrictive element in a plan view can be a rectangular shape in which each axis in a longitudinal direction is parallel to a straight line extending in the radial direction from the center of the pressure receiving region. The shape of the second magnetostrictive element and the fourth magnetostrictive element in a plan view can be a rectangular shape in which each axis in a longitudinal direction is perpendicular to a straight line extending in the radial direction from the center of the pressure receiving region.

According to the pressure sensor of Embodiment 1 described above, the pressure is measured by the magnetostrictive measurement unit in a range having a small pressure value, and the pressure is measured by the piezostrictive measurement unit in a range having a great pressure value. Therefore, the pressure can be measured with satisfactory sensitivity in a low pressure range, and can be accurately measured in a wider pressure range.

Embodiment 2

Figure 2A:
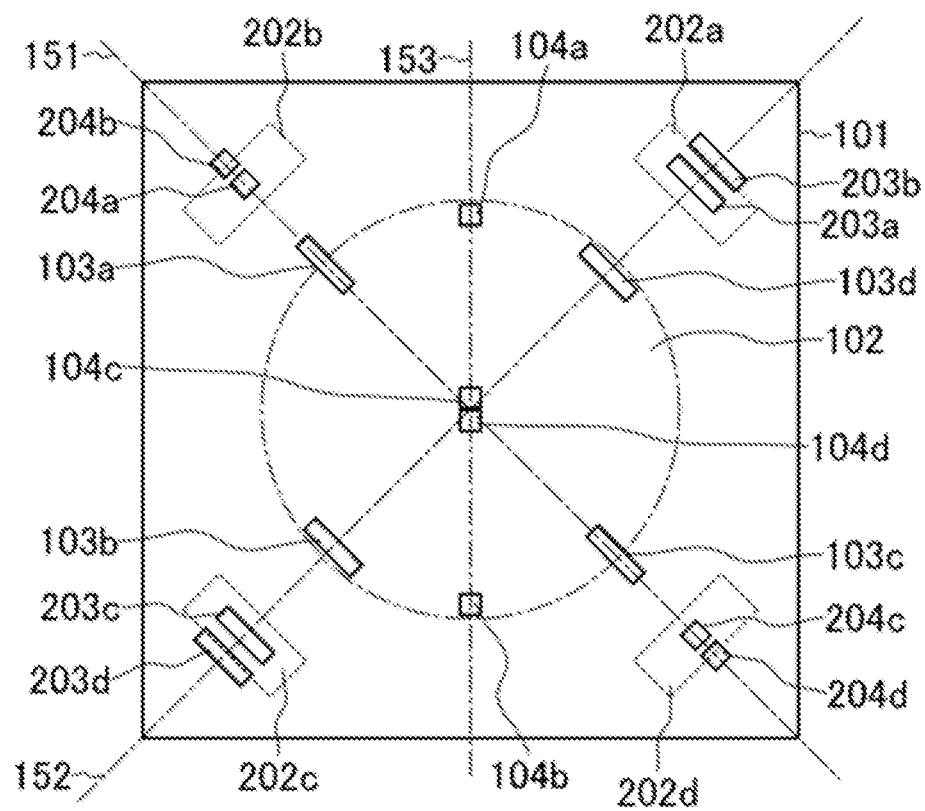
FIG. 2A is a plan view illustrating a configuration of a pressure sensor according to Embodiment 2 of the present disclosure.
Figure 2B:
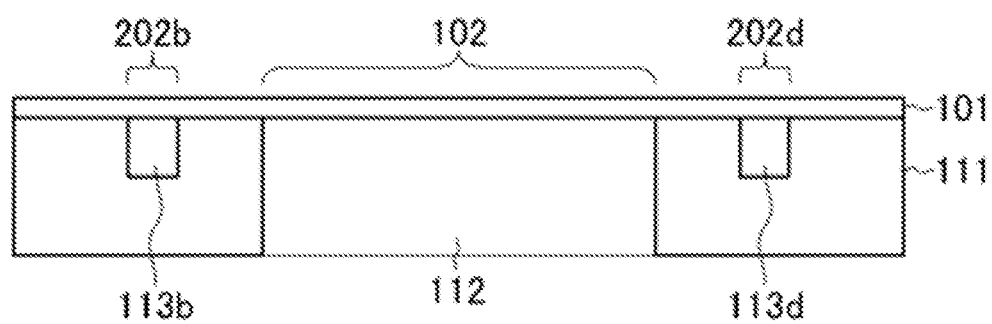
FIG. 2B is a sectional view illustrating a configuration of the pressure sensor according to Embodiment 2 of the present disclosure.

Next, a pressure sensor according to Embodiment 2 of the present disclosure will be described with reference to FIGS. 2A and 2B.

The pressure sensor includes the diaphragm layer 101 and the pressure receiving region 102 formed in the diaphragm layer 101. In addition, the pressure sensor includes the first piezostrictive element 103a, the second piezostrictive element 103b, the third piezostrictive element 103c, and the fourth piezostrictive element 103d. In addition, the pressure sensor includes the first magnetostrictive element 104a, the second magnetostrictive element 104b, the third magnetostrictive element 104c, and the fourth magnetostrictive element 104d. These configurations are the same as those in Embodiment 1 described above.

In Embodiment 2, first, a first auxiliary pressure receiving region 202a, a second auxiliary pressure receiving region 202b, a third auxiliary pressure receiving region 202c, and a fourth auxiliary pressure receiving region 202d are formed around the pressure receiving region 102 of the diaphragm layer 101. For example, as illustrated in FIG. 2B, the second auxiliary pressure receiving region 202b and the fourth auxiliary pressure receiving region 202d are partial regions of the diaphragm layer 101 which are defined by a cavity 113b and a cavity 113d which are formed in the base 111. The same applies to the first auxiliary pressure receiving region 202a and the third auxiliary pressure receiving region 202c. FIG. 2B illustrates a cross section in the first straight line 151 of FIG. 2A. Each of the first auxiliary pressure receiving region 202a, the second auxiliary pressure receiving region 202b, the third auxiliary pressure receiving region 202c, and the fourth auxiliary pressure receiving region 202d has a rectangular shape having different lengths of adjacent sides in a plan view.

In addition, in Embodiment 2, a first auxiliary piezostrictive element 203a and a second auxiliary piezostrictive element 203b are provided in the first auxiliary pressure receiving region 202a. In addition, a first auxiliary magnetostrictive element 204a and a second auxiliary magnetostrictive element 204b are provided in the second auxiliary pressure receiving region 202b. In addition, a third auxiliary piezostrictive element 203c and a fourth auxiliary piezostrictive element 203d are provided in the third auxiliary pressure receiving region 202c. In addition, a third auxiliary magnetostrictive element 204c and a fourth auxiliary magnetostrictive element 204d are provided in the fourth auxiliary pressure receiving region 202d.

The first auxiliary piezostrictive element 203a, the second auxiliary piezostrictive element 203b, the third auxiliary piezostrictive element 203c, and the fourth auxiliary piezostrictive element 203d are the same as the first piezostrictive element 103a, the second piezostrictive element 103b, the third piezostrictive element 103c, and the fourth piezostrictive element 103d, and are elements provided with piezoresistance regions.

The first auxiliary magnetostrictive element 204a, the second auxiliary magnetostrictive element 204b, the third auxiliary magnetostrictive element 204c, and the fourth auxiliary magnetostrictive element 204d are the same as the first magnetostrictive element 104a, the second magnetostrictive element 104b, the third magnetostrictive element 104c, and the fourth magnetostrictive element 104d.

In Embodiment 2, a differential pressure measurement unit is configured to include the pressure receiving region 102. A static pressure measurement unit is configured to include the first auxiliary pressure receiving region 202a, the second auxiliary pressure receiving region 202b, the third auxiliary pressure receiving region 202c, and the fourth auxiliary pressure receiving region 202d (refer to PTL 1).

Here, each of the first auxiliary piezostrictive element 203a, the first auxiliary magnetostrictive element 204a, the third auxiliary piezostrictive element 203c, and the third auxiliary magnetostrictive element 204c is disposed in the center of each of the first auxiliary pressure receiving region 202a, the second auxiliary pressure receiving region 202b, the third auxiliary pressure receiving region 202c, and the fourth auxiliary pressure receiving region 202d, respectively. In addition, the first auxiliary piezostrictive element 203a and the third auxiliary piezostrictive element 203c are provided along the longitudinal direction of the auxiliary pressure receiving region having a rectangular shape in a plan view.

In addition, each of the second auxiliary piezostrictive element 203b, the second auxiliary magnetostrictive element 204b, the fourth auxiliary piezostrictive element 203d, and the fourth auxiliary magnetostrictive element 204d is disposed on an edge of each of the first auxiliary pressure receiving region 202a, the second auxiliary pressure receiving region 202b, the third auxiliary pressure receiving region 202c, and the fourth auxiliary pressure receiving region 202d, respectively. In addition, the second auxiliary piezostrictive element 203b and the fourth auxiliary piezostrictive element 203d are provided along the longitudinal direction of the auxiliary pressure receiving region having a rectangular shape in a plan view.

According to Embodiment 2 described above, the stress generated in the static pressure measurement unit can be efficiently measured. As a result, measurement sensitivity of a static pressure can be improved.

In Embodiment 2 described above, the pressure is measured by the magnetostrictive measurement unit in a range having a small pressure value, and the pressure is measured by the piezostrictive measurement unit in a range having a great pressure value. Therefore, the pressure can be measured with satisfactory sensitivity in a low pressure range, and can be accurately measured in a wider pressure range.

Embodiment 3

Figure 3:
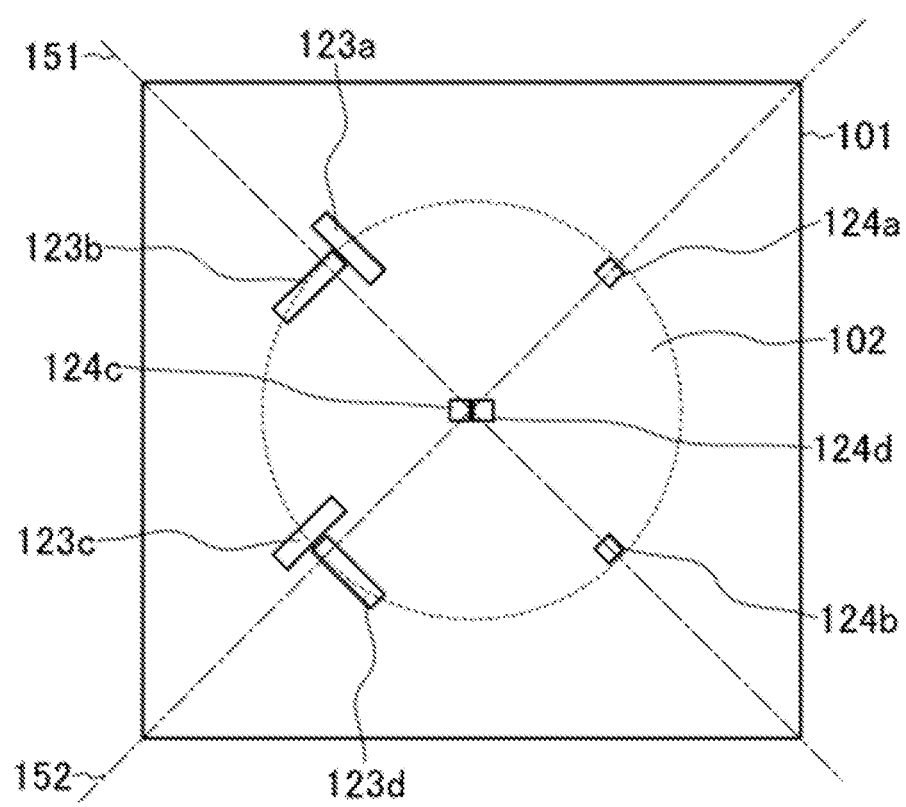
FIG. 3 is a plan view illustrating a configuration of a pressure sensor according to Embodiment 3 of the present disclosure.

Next, a pressure sensor according to Embodiment 3 of the present disclosure will be described with reference to FIG. 3.

The pressure sensor includes the diaphragm layer 101 and the pressure receiving region 102 formed in the diaphragm layer 101. For example, the diaphragm layer 101 is formed on the base 111. These configurations are the same as those in Embodiment 1 described above.

In addition, the pressure sensor also includes a first piezostrictive element 123a, a second piezostrictive element 123b, a third piezostrictive element 123c, and a fourth piezostrictive element 123d in the diaphragm layer 101 on outer peripheral portions of the pressure receiving region 102. Each of the first piezostrictive element 123a, the second piezostrictive element 123b, the third piezostrictive element 123c, and the fourth piezostrictive element 123d serves as a piezostrictive measurement unit that measures the strain of the pressure receiving region 102 by using the piezoresistance effect.

For example, the diaphragm layer 101 is formed of single-crystal silicon whose main surface has a plane orientation of (100). In addition, the piezoresistive element can be formed of a piezoresistance region including a p-type region into which boron (B) serving as a p-type impurity is introduced, at a predetermined location of the diaphragm layer 101 formed of the single-crystal silicon.

In Embodiment 3, the shape of the first piezostrictive element 123a and the third piezostrictive element 123c in a plan view is a rectangular shape in which each axis in the longitudinal direction is parallel to the straight line extending in the radial direction from the center of the pressure receiving region 102. In addition, the shape of the second piezostrictive element 123b and the fourth piezostrictive element 123d in a plan view is a rectangular shape in which each axis in the longitudinal direction is perpendicular to the straight line extending in the radial direction from the center of the pressure receiving region 102.

In addition, in Embodiment 3, the first piezostrictive element 123a and the second piezostrictive element 123b are disposed adjacent to each other, and the third piezostrictive element 123c and the fourth piezostrictive element 123d are disposed adjacent to each other. For example, a pair of the first piezostrictive element 123a and the second piezostrictive element 123b is disposed on the first straight line 151, and a pair of the third piezostrictive element 123c and the fourth piezostrictive element 123d is disposed on the second straight line 152. As described above, the first straight line 151 and the second straight line 152 extend in a crystalline orientation of 110 of the single-crystal silicon whose main surface forming the diaphragm layer 101 has a plane orientation of (100).

According to the above-described configuration, when the pressure receiving region 102 is deflected, the first piezostrictive element 123a and the second piezostrictive element 123b, and the third piezostrictive element 123c and the fourth piezostrictive element 123d, are in a state where the signs of respective resistance values are different from each other.

In addition, the pressure sensor includes a first magnetostrictive element 124a, a second magnetostrictive element 124b, a third magnetostrictive element 124c, and a fourth magnetostrictive element 124d in the pressure receiving region 102 of the diaphragm layer 101. These elements are the same as the first magnetostrictive element 104a, the second magnetostrictive element 104b, the third magnetostrictive element 104c, and the fourth magnetostrictive element 104d of Embodiment 1 described above. Each of the elements includes a detection magnetic layer whose magnetization is changed due to the strain and a reference magnetic layer serving as a reference for the detection magnetic layer. The detection magnetic layer and the reference magnetic layer are subjected to tunnel junction via a barrier layer, and measure the strain of the pressure receiving region 102 by using a resistance change between the detection magnetic layer and the reference magnetic layer.

In Embodiment 3, the first magnetostrictive element 124a and the second magnetostrictive element 124b are disposed at locations where a tensile strain is generated due to the deflection of the pressure receiving region 102. High sensitivity can be obtained by disposing the elements at the location where the tensile strain is most generated (position where the tensile strain peaks). For example, the first magnetostrictive element 124a and the second magnetostrictive element 124b are disposed in the diaphragm layer 101 on the outer peripheral portions of the pressure receiving region 102. In FIG. 3, the first magnetostrictive element 124a is disposed on the second straight line 152, and the second magnetostrictive element 124b is disposed on the first straight line 151. However, this configuration is an example, and the present disclosure is not limited thereto.

On the other hand, the third magnetostrictive element 124c and the fourth magnetostrictive element 124d are disposed at locations where a compression strain is generated due to the deflection of the pressure receiving region 102. For example, the third magnetostrictive element 124c and the fourth magnetostrictive element 124d are disposed in a central portion of the pressure receiving region 102. The third magnetostrictive element 124c and the fourth magnetostrictive element 124d can also be disposed at locations (other than the pressure receiving region 102) where the strain is not generated.

In Embodiment 3, the first piezostrictive element 123a, the second piezostrictive element 123b, the third piezostrictive element 123c, and the fourth piezostrictive element 123d form a first bridge circuit using the elements as resistance elements. When stress is generated in the pressure receiving region 102 in a state where a constant current flows, the first bridge circuit outputs a change in the resistance value of each piezostrictive element (piezoresistance region) which is caused by the generated stress, as a voltage change. Each node of the first bridge circuit is connected to an electrode (not illustrated) via a wiring pattern formed on a surface of a region (not illustrated) of the diaphragm layer 101.

In addition, in Embodiment 3, the first magnetostrictive element 124a, the second magnetostrictive element 124b, the third magnetostrictive element 124c, and the fourth magnetostrictive element 124d form a second bridge circuit using the elements as resistance elements. When the stress is generated in the pressure receiving region 102 in a state where an external magnetic field is applied to the first magnetostrictive element 124a, the second magnetostrictive element 124b, the third magnetostrictive element 124c, and the fourth magnetostrictive element 124d, the second bridge circuit outputs a change in the resistance value of each magnetic tunnel junction element which is caused by the generated stress, as a voltage change.

For example, the first measurement unit obtains a first measurement candidate by measurement using the first piezostrictive element 123a, the second piezostrictive element 123b, the third piezostrictive element 123c, and the fourth piezostrictive element 123d. In addition, the second measurement unit obtains a second measurement candidate by measurement using the first magnetostrictive element 124a, the second magnetostrictive element 124b, the third magnetostrictive element 124c, and the fourth magnetostrictive element 124d.

After each candidate is obtained as described above, when the first measurement candidate falls within a range of a set minute pressure value, a determination unit determines the second measurement candidate as a measurement result. On the other hand, when the first measurement candidate exceeds the range of the set minute pressure value and has a greater pressure value, the determination unit determines the first measurement candidate as the measurement result. The range of the minute pressure value is set to a range in which the magnetostrictive element has response linearity.

In the pressure sensor according to Embodiment 3 described above, the pressure is measured by the magnetostrictive measurement unit in a range having a small pressure value, and the pressure is measured by the piezostrictive measurement unit in a range having a great pressure value. Therefore, the pressure can be measured with satisfactory sensitivity in a low pressure range, and can be accurately measured in a wider pressure range.

Embodiment 4

Figure 4:
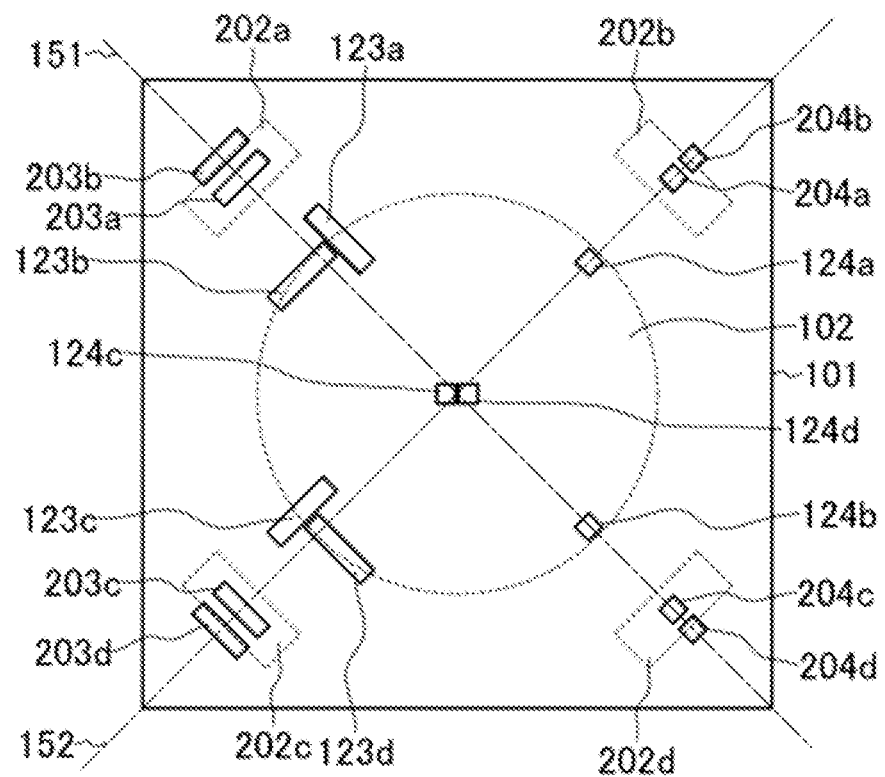
FIG. 4 is a plan view illustrating a configuration of a pressure sensor according to Embodiment 4 of the present disclosure.

Next, a pressure sensor according to Embodiment 4 of the present disclosure will be described with reference to FIG. 4.

The pressure sensor includes the diaphragm layer 101 and the pressure receiving region 102 formed in the diaphragm layer 101. In addition, the pressure sensor includes the first piezostrictive element 123a, the second piezostrictive element 123b, the third piezostrictive element 123c, and the fourth piezostrictive element 123d. In addition, the pressure sensor includes the first magnetostrictive element 124a, the second magnetostrictive element 124b, the third magnetostrictive element 124c, and the fourth magnetostrictive element 124d. These configurations are the same as those in Embodiment 3 described above.

In Embodiment 4, first, the first auxiliary pressure receiving region 202a, the second auxiliary pressure receiving region 202b, the third auxiliary pressure receiving region 202c, and the fourth auxiliary pressure receiving region 202d are formed around the pressure receiving region 102 of the diaphragm layer 101. As explained referring to FIG. 2B, these auxiliary pressure receiving regions (202a-202d) are defined by a cavity formed just below the corresponding region of each auxiliary pressure receiving region in the base 111.

Here, in Embodiment 4, the first auxiliary pressure receiving region 202a is disposed on the first straight line 151. A pair of the first piezostrictive element 123a and the second piezostrictive element 123b is disposed on the first straight line 151. In other words, the first auxiliary pressure receiving region 202a is disposed on an extension line in which a pair of the first piezostrictive element 123a and the second piezostrictive element 123b is disposed when viewed from the center of the pressure receiving region 102.

In addition, the second auxiliary pressure receiving region 202b is disposed on the second straight line 152. The first magnetostrictive element 124a is disposed on the second straight line 152. In other words, the second auxiliary pressure receiving region 202b is disposed on an extension line in which the first magnetostrictive element 124a is disposed when viewed from the center of the pressure receiving region 102.

In addition, the third auxiliary pressure receiving region 202c is disposed on the second straight line 152. A pair of the third piezostrictive element 123c and the fourth piezostrictive element 123d is disposed on the second straight line 152. In other words, the third auxiliary pressure receiving region 202c is disposed on an extension line in which a pair of the third piezostrictive element 123c and the fourth piezostrictive element 123d is disposed when viewed from the center of the pressure receiving region 102.

In addition, the fourth auxiliary pressure receiving region 202d is disposed on the first straight line 151. The second magnetostrictive element 124b is disposed on the first straight line 151. In other words, the fourth auxiliary pressure receiving region 202d is disposed on an extension line in which the second magnetostrictive element 124b is disposed when viewed from the center of the pressure receiving region 102.

In addition, in Embodiment 4, the first auxiliary piezostrictive element 203a and the second auxiliary piezostrictive element 203b are provided in the first auxiliary pressure receiving region 202a. In addition, the first auxiliary magnetostrictive element 204a and the second auxiliary magnetostrictive element 204b are provided in the second auxiliary pressure receiving region 202b. In addition, the third auxiliary piezostrictive element 203c and the fourth auxiliary piezostrictive element 203d are provided in the third auxiliary pressure receiving region 202c. In addition, the third auxiliary magnetostrictive element 204c and the fourth auxiliary magnetostrictive element 204d are provided in the fourth auxiliary pressure receiving region 202d.

The first auxiliary piezostrictive element 203a, the second auxiliary piezostrictive element 203b, the third auxiliary piezostrictive element 203c, and the fourth auxiliary piezostrictive element 203d are the same as the first piezostrictive element 123a, the second piezostrictive element 123b, the third piezostrictive element 123c, and the fourth piezostrictive element 123d, and are elements provided with piezoresistance regions.

The first auxiliary magnetostrictive element 204a, the second auxiliary magnetostrictive element 204b, the third auxiliary magnetostrictive element 204c, and the fourth auxiliary magnetostrictive element 204d are the same as the first magnetostrictive element 124a, the second magnetostrictive element 124b, the third magnetostrictive element 124c, and the fourth magnetostrictive element 124d.

In Embodiment 4, a differential pressure measurement unit is configured to include the pressure receiving region 102. A static pressure measurement unit is configured to include the first auxiliary pressure receiving region 202a, the second auxiliary pressure receiving region 202b, the third auxiliary pressure receiving region 202c, and the fourth auxiliary pressure receiving region 202d (refer to PTL 1).

Here, each of the first auxiliary piezostrictive element 203a, the first auxiliary magnetostrictive element 204a, the third auxiliary piezostrictive element 203c, and the third auxiliary magnetostrictive element 204c is disposed in the center of each of the first auxiliary pressure receiving region 202a, the second auxiliary pressure receiving region 202b, the third auxiliary pressure receiving region 202c, and the fourth auxiliary pressure receiving region 202d, respectively. In addition, the first auxiliary piezostrictive element 203a and the third auxiliary piezostrictive element 203c are provided along the longitudinal direction of the auxiliary pressure receiving region having a rectangular shape in a plan view.

In addition, each of the second auxiliary piezostrictive element 203b, the second auxiliary magnetostrictive element 204b, the fourth auxiliary piezostrictive element 203d, and the fourth auxiliary magnetostrictive element 204d is disposed on an edge of each of the first auxiliary pressure receiving region 202a, the second auxiliary pressure receiving region 202b, the third auxiliary pressure receiving region 202c, and the fourth auxiliary pressure receiving region 202d, respectively. In addition, the second auxiliary piezostrictive element 203b and the fourth auxiliary piezostrictive element 203d are provided along the longitudinal direction of the auxiliary pressure receiving region having a rectangular shape in a plan view.

According to Embodiment 4 described above, the stress generated in the static pressure measurement unit can be efficiently measured. As a result, measurement sensitivity of a static pressure can be improved.

In Embodiment 4 described above, the pressure is measured by the magnetostrictive measurement unit in a range having a small pressure value, and the pressure is measured by the piezostrictive measurement unit in a range having a great pressure value. Therefore, the pressure can be measured with satisfactory sensitivity in a low pressure range, and can be accurately measured in a wider pressure range.

Embodiment 5

Figure 5:
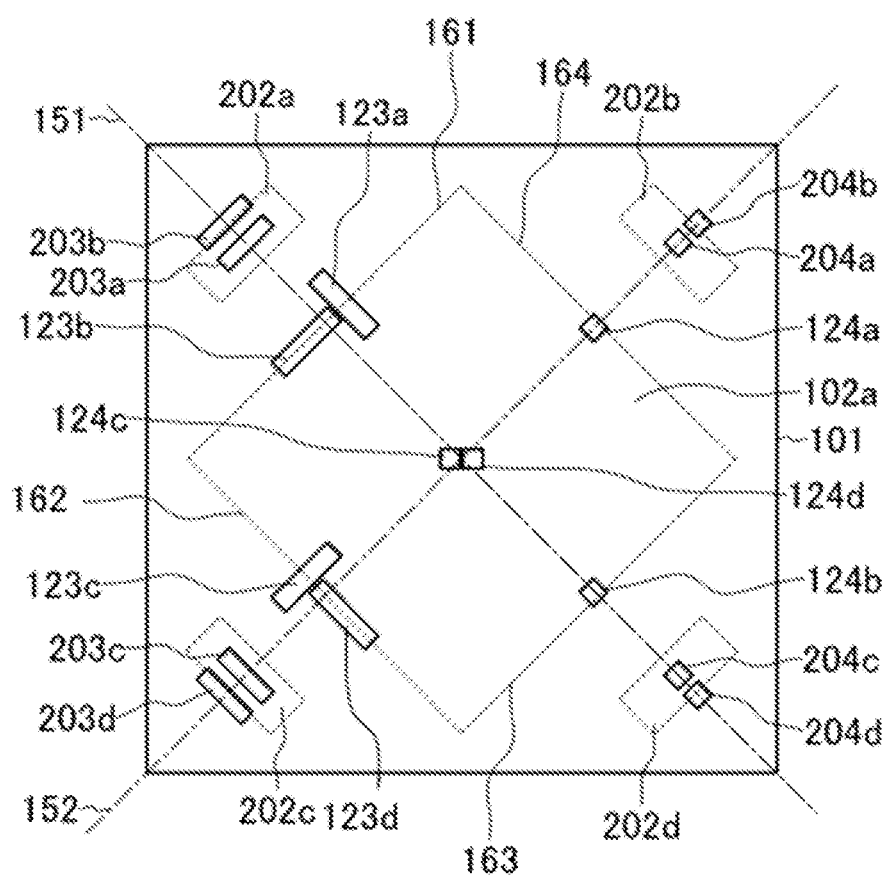
FIG. 5 is a plan view illustrating a configuration of a pressure sensor according to Embodiment 5 of the present disclosure.

Next, a pressure sensor according to Embodiment 5 of the present disclosure will be described with reference to FIG. 5.

The pressure sensor includes the diaphragm layer 101 and a pressure receiving region 102a formed in the diaphragm layer 101. The pressure receiving region 102a has a square shape in a plan view. Each side of the square shape extends in the crystalline orientation of 110 of the single-crystal silicon whose main surface forming the diaphragm layer 101 has a plane orientation of (100).

In addition, the pressure sensor includes the first piezostrictive element 123a, the second piezostrictive element 123b, the third piezostrictive element 123c, and the fourth piezostrictive element 123d. A pair of the first piezostrictive element 123a and the second piezostrictive element 123b is disposed in a central portion of a first side 161 of the pressure receiving region 102a having a square shape in a plan view. In addition, a pair of the third piezostrictive element 123c and the fourth piezostrictive element 123d is disposed in a central portion of a second side 162 of the pressure receiving region 102a having a square shape in a plan view. The second side 162 is a side adjacent to the first side 161.

In addition, the pressure sensor includes the first magnetostrictive element 124a, the second magnetostrictive element 124b, the third magnetostrictive element 124c, and the fourth magnetostrictive element 124d. The first magnetostrictive element 124a is disposed in a central portion of a fourth side 164 of the pressure receiving region 102a having a square shape in a plan view. In addition, the second magnetostrictive element 124b is disposed in a central portion of a third side 163 of the pressure receiving region 102a having a square shape in a plan view. The third side 163 is a side adjacent to the second side 162 and the fourth side 164 and facing the first side 161. The fourth side 164 is a side adjacent to the first side 161 and the third side 163 and facing the second side 162.

A configuration of each element described above is the same as that of Embodiment 4 described above.

In Embodiment 5, as in Embodiment 4 described above, the first auxiliary pressure receiving region 202a, the second auxiliary pressure receiving region 202b, the third auxiliary pressure receiving region 202c, and the fourth auxiliary pressure receiving region 202d are formed around the pressure receiving region 102a of the diaphragm layer 101. In addition, in Embodiment 5, the first auxiliary pressure receiving region 202a is disposed on the first straight line 151. A pair of the first piezostrictive element 123a and the second piezostrictive element 123b is disposed on the first straight line 151. In other words, the first auxiliary pressure receiving region 202a is disposed on an extension line in which a pair of the first piezostrictive element 123a and the second piezostrictive element 123b is disposed when viewed from a center of the pressure receiving region 102a.

In addition, the second auxiliary pressure receiving region 202b is disposed on the second straight line 152. The first magnetostrictive element 124a is disposed on the second straight line 152. In other words, the second auxiliary pressure receiving region 202b is disposed on an extension line in which the first magnetostrictive element 124a is disposed when viewed from the center of the pressure receiving region 102a.

In addition, the third auxiliary pressure receiving region 202c is disposed on the second straight line 152. A pair of the third piezostrictive element 123c and the fourth piezostrictive element 123d is disposed on the second straight line 152. In other words, the third auxiliary pressure receiving region 202c is disposed on an extension line in which a pair of the third piezostrictive element 123c and the fourth piezostrictive element 123d is disposed when viewed from the center of the pressure receiving region 102a.

In addition, the fourth auxiliary pressure receiving region 202d is disposed on the first straight line 151. The second magnetostrictive element 124b is disposed on the first straight line 151. In other words, the fourth auxiliary pressure receiving region 202d is disposed on an extension line in which the second magnetostrictive element 124b is disposed when viewed from the center of the pressure receiving region 102a.

In addition, in Embodiment 5, the first auxiliary piezostrictive element 203a and the second auxiliary piezostrictive element 203b are provided in the first auxiliary pressure receiving region 202a. In addition, the first auxiliary magnetostrictive element 204a and the second auxiliary magnetostrictive element 204b are provided in the second auxiliary pressure receiving region 202b. In addition, the third auxiliary piezostrictive element 203c and the fourth auxiliary piezostrictive element 203d are provided in the third auxiliary pressure receiving region 202c. In addition, the third auxiliary magnetostrictive element 204c and the fourth auxiliary magnetostrictive element 204d are provided in the fourth auxiliary pressure receiving region 202d.

The first auxiliary piezostrictive element 203a, the second auxiliary piezostrictive element 203b, the third auxiliary piezostrictive element 203c, and the fourth auxiliary piezostrictive element 203d are the same as the first piezostrictive element 123a, the second piezostrictive element 123b, the third piezostrictive element 123c, and the fourth piezostrictive element 123d, and are elements provided with piezoresistance regions.

The first auxiliary magnetostrictive element 204a, the second auxiliary magnetostrictive element 204b, the third auxiliary magnetostrictive element 204c, and the fourth auxiliary magnetostrictive element 204d are the same as the first magnetostrictive element 124a, the second magnetostrictive element 124b, the third magnetostrictive element 124c, and the fourth magnetostrictive element 124d.

In Embodiment 5, a differential pressure measurement unit is configured to include the pressure receiving region 102a. A static pressure measurement unit is configured to include the first auxiliary pressure receiving region 202a, the second auxiliary pressure receiving region 202b, the third auxiliary pressure receiving region 202c, and the fourth auxiliary pressure receiving region 202d (refer to PTL 1).

Here, each of the first auxiliary piezostrictive element 203a, the first auxiliary magnetostrictive element 204a, the third auxiliary piezostrictive element 203c, and the third auxiliary magnetostrictive element 204c is disposed in the center of each of the first auxiliary pressure receiving region 202a, the second auxiliary pressure receiving region 202b, the third auxiliary pressure receiving region 202c, and the fourth auxiliary pressure receiving region 202d, respectively. In addition, the first auxiliary piezostrictive element 203a and the third auxiliary piezostrictive element 203c are provided along the longitudinal direction of the auxiliary pressure receiving region having a rectangular shape in a plan view.

In addition, each of the second auxiliary piezostrictive element 203b, the second auxiliary magnetostrictive element 204b, the fourth auxiliary piezostrictive element 203d, and the fourth auxiliary magnetostrictive element 204d is disposed on an edge of each of the first auxiliary pressure receiving region 202a, the second auxiliary pressure receiving region 202b, the third auxiliary pressure receiving region 202c, and the fourth auxiliary pressure receiving region 202d, respectively. In addition, the second auxiliary piezostrictive element 203b and the fourth auxiliary piezostrictive element 203d are provided along the longitudinal direction of the auxiliary pressure receiving region having a rectangular shape in a plan view.

According to Embodiment 5 described above, the stress generated in the static pressure measurement unit can be efficiently measured. As a result, measurement sensitivity of a static pressure can be improved.

In Embodiment 5 described above, the pressure is measured by the magnetostrictive measurement unit in a range having a small pressure value, and the pressure is measured by the piezostrictive measurement unit in a range having a great pressure value. Therefore, the pressure can be measured with satisfactory sensitivity in a low pressure range, and can be accurately measured in a wider pressure range.

As described above, according to the present disclosure, the piezostrictive measurement unit and the magnetostrictive measurement unit are provided in the pressure receiving region of the diaphragm layer. Therefore, the pressure can be accurately measured in a wider pressure range.

The present disclosure is not limited to the embodiments described above, and it is obvious that various modifications and combinations can be made by a person having ordinary knowledge in the field within the technical idea of the present disclosure.

DESCRIPTION OF REFERENCE NUMERALS AND SIGNS

101: diaphragm layer, 102: pressure receiving region, 103a: first piezostrictive element, 103b: second piezostrictive element, 103c: third piezostrictive element, 103d: fourth piezostrictive element, 104a: first magnetostrictive element, 104b: second magnetostrictive element, 104c: third magnetostrictive element, 104d: fourth magnetostrictive element, 111: base, 112: through-hole, 151: first straight line, 152: second straight line, 153: third straight line

The invention claimed is:

1. A pressure sensor comprising:
a diaphragm layer;
a pressure receiving region formed in the diaphragm layer;
a piezostrictive measurement unit provided in the diaphragm layer in an outer peripheral portion of the pressure receiving region, and formed of a piezostrictive element that measures a strain of the pressure receiving region by using a piezoresistance effect; and
a magnetostrictive measurement unit provided in the pressure receiving region of the diaphragm layer, and formed of a magnetostrictive element that is formed of a material whose magnetization is changed due to the strain, and that measures the strain of the pressure receiving region.

2. The pressure sensor according to claim 1,
wherein the piezostrictive measurement unit and the magnetostrictive measurement unit are disposed at positions where generated stress peaks in the pressure receiving region.

3. The pressure sensor according to claim 1,
wherein the piezostrictive measurement unit is disposed at a location where a piezoelectric effect is generated in the pressure receiving region.

4. The pressure sensor according to claim 1, wherein
the piezostrictive measurement unit is formed of a first piezostrictive element, a second piezostrictive element, a third piezostrictive element, and a fourth piezostrictive element which form a first bridge circuit,
the magnetostrictive measurement unit is formed of a first magnetostrictive element, a second magnetostrictive element, a third magnetostrictive element, and a fourth magnetostrictive element which form a second bridge circuit, and
the magnetostrictive measurement unit is disposed at a location different from that of the piezostrictive measurement unit.

5. The pressure sensor according to claim 4, wherein
each of the first piezostrictive element, the second piezostrictive element, the third piezostrictive element, and the fourth piezostrictive element has a rectangular shape in a plan view,
the first piezostrictive element and the third piezostrictive element are in a state where each axis in a longitudinal direction is parallel to a straight line extending in a radial direction from a center of the pressure receiving region, and
the second piezostrictive element and the fourth piezostrictive element are in a state where each axis in a longitudinal direction is perpendicular to a straight line extending in the radial direction from the center of the pressure receiving region.

6. The pressure sensor according to claim 5, wherein
the first piezostrictive element and the second piezostrictive element are disposed adjacent to each other, and
the third piezostrictive element and the fourth piezostrictive element are disposed adjacent to each other.

7. The pressure sensor according to claim 5, further comprising:
a first auxiliary pressure receiving region, a second auxiliary pressure receiving region, a third auxiliary pressure receiving region, and a fourth auxiliary pressure receiving region which are formed around the pressure receiving region of the diaphragm layer;
a first auxiliary piezostrictive element and a second auxiliary piezostrictive element which are provided in the first auxiliary pressure receiving region, and a first auxiliary magnetostrictive element and a second auxiliary magnetostrictive element which are provided in the second auxiliary pressure receiving region; and
a third auxiliary piezostrictive element and a fourth auxiliary piezostrictive element which are provided in the third auxiliary pressure receiving region, and a third auxiliary magnetostrictive element and a fourth auxiliary magnetostrictive element which are provided in the fourth auxiliary pressure receiving region;
wherein the first auxiliary pressure receiving region, the second auxiliary pressure receiving region, the third auxiliary pressure receiving region, and the fourth auxiliary pressure receiving region are respectively disposed at an equal distance from the center of the pressure receiving region.

8. The pressure sensor according to claim 6, further comprising:
a first auxiliary pressure receiving region, a second auxiliary pressure receiving region, a third auxiliary pressure receiving region, and a fourth auxiliary pressure receiving region which are formed around the pressure receiving region of the diaphragm layer;

a first auxiliary piezostrictive element and a second auxiliary piezostrictive element which are provided in the first auxiliary pressure receiving region, and a first auxiliary magnetostrictive element and a second auxiliary magnetostrictive element which are provided in the second auxiliary pressure receiving region; and a third auxiliary piezostrictive element and a fourth auxiliary piezostrictive element which are provided in the third auxiliary pressure receiving region, and a third auxiliary magnetostrictive element and a fourth auxiliary magnetostrictive element which are provided in the fourth auxiliary pressure receiving region;

wherein the first auxiliary pressure receiving region, the second auxiliary pressure receiving region, the third auxiliary pressure receiving region, and the fourth auxiliary pressure receiving region are respectively disposed at an equal distance from the center of the pressure receiving region.

9. The pressure sensor according to claim 1, wherein the pressure receiving region has a circular shape in a plan view.

10. The pressure sensor according to claim 4, wherein the pressure receiving region has a circular shape in a plan view.

11. The pressure sensor according to claim 5, wherein the pressure receiving region has a circular shape in a plan view.

12. The pressure sensor according to claim 6, wherein the pressure receiving region has a circular shape in a plan view.

13. The pressure sensor according to claim 7, wherein the pressure receiving region has a circular shape in a plan view.

14. The pressure sensor according to claim 8, wherein the pressure receiving region has a circular shape in a plan view.

15. The pressure sensor according to claim 1, wherein the pressure receiving region has a square shape in a plan view.

16. The pressure sensor according to claim 4, wherein the pressure receiving region has a square shape in a plan view.

17. The pressure sensor according to claim 5, wherein the pressure receiving region has a square shape in a plan view.

18. The pressure sensor according to claim 6, wherein the pressure receiving region has a square shape in a plan view.

19. The pressure sensor according to claim 7, wherein the pressure receiving region has a square shape in a plan view.

20. The pressure sensor according to claim 8, wherein the pressure receiving region has a square shape in a plan view.

* * * * *